US012220922B2

(12) United States Patent
Inomata et al.

(10) Patent No.: US 12,220,922 B2
(45) Date of Patent: Feb. 11, 2025

(54) LIQUID STORAGE BODY AND LIQUID JETTING APPARATUS

(71) Applicant: CANON KABUSHIKI KAISHA, Tokyo (JP)

(72) Inventors: Hiroshi Inomata, Kanagawa (JP); Ken Ikegame, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 18/176,411

(22) Filed: Feb. 28, 2023

(65) Prior Publication Data

US 2023/0321991 A1 Oct. 12, 2023

(30) Foreign Application Priority Data

Apr. 6, 2022 (JP) ................................ 2022-063281
Jan. 11, 2023 (JP) ................................ 2023-002383

(51) Int. Cl.
*B41J 2/175* (2006.01)

(52) U.S. Cl.
CPC ....... *B41J 2/17523* (2013.01); *B41J 2/17513* (2013.01); *B41J 2002/17516* (2013.01)

(58) Field of Classification Search
CPC ................ B41J 2/17523; B41J 2/17513; B41J 2002/17516
USPC ........................................................... 347/86
See application file for complete search history.

(56) References Cited

U.S. PATENT DOCUMENTS

2018/0104955 A1* 4/2018 Kawate .................... B41J 29/13
2021/0268802 A1 9/2021 Ikegame .................. B41J 2/175
2022/0379621 A1 12/2022 Inomata et al. ......... B41J 2/175
2023/0046404 A1 2/2023 Katano et al. ........... B41J 2/175

FOREIGN PATENT DOCUMENTS

JP 2018-065373 4/2018

* cited by examiner

*Primary Examiner* — Jason S Uhlenhake
*Assistant Examiner* — Alexander D Shenderov
(74) *Attorney, Agent, or Firm* — Venable LLP

(57) ABSTRACT

A liquid storage body includes: a bag part being flexible and configured to store a liquid therein; a liquid outlet part attached to a first end portion of the bag part and configured to discharge to a liquid jetting apparatus stored the liquid in the bag part; and a channel part disposed inside the bag part and configured to let the liquid flow to the liquid outlet part, in which both ends of the channel part are connected to the liquid outlet part, a first area of the channel part is located near a second end portion of the bag part located farthest from the first end portion, and the channel part has a liquid inlet portion through which to take the liquid inside the bag part into the channel part.

14 Claims, 13 Drawing Sheets

LIQUID STORAGE BODY AND LIQUID JETTING APPARATUS

BACKGROUND OF THE INVENTION

Field of the Invention

The present disclosure relates to a liquid storage body and a liquid jetting apparatus.

Description of the Related Art

Japanese Patent Laid-Open No. 2018-65373 discloses a liquid storage body having a spacer member and two liquid outlet tubes connected to the spacer member inside a flexible bag.

The liquid storage body disclosed in Japanese Patent Laid-Open No. 2018-65373 has the spacer member in order to completely use up the liquid inside the bag. There are, however, cases where the liquid inside the bag cannot be completely used up depending on how the bag is crushed.

To solve this problem, an object of the present disclosure is to provide a technology capable of improving the ease of using up a liquid stored in a liquid storage body.

SUMMARY OF THE INVENTION

A liquid storage body according to the present disclosure to solve the above problem includes: a bag part being flexible and configured to store a liquid therein; a liquid outlet part attached to a first end portion of the bag part and configured to discharge the liquid stored in the bag part into a liquid jetting apparatus; and a channel part disposed inside the bag part and configured to let the liquid flow to the liquid outlet part, in which both ends of the channel part are connected to the liquid outlet part, a first area of the channel part is located near a second end portion of the bag part located farthest from the first end portion, and the channel part has a liquid inlet portion through which to take the liquid inside the bag part into the channel part.

Further features of the present invention will become apparent from the following description of exemplary embodiments with reference to the attached drawings.

DESCRIPTION OF THE EMBODIMENTS

Embodiments of the present invention will be described with reference to the drawings.

First Embodiment

Figure 1:
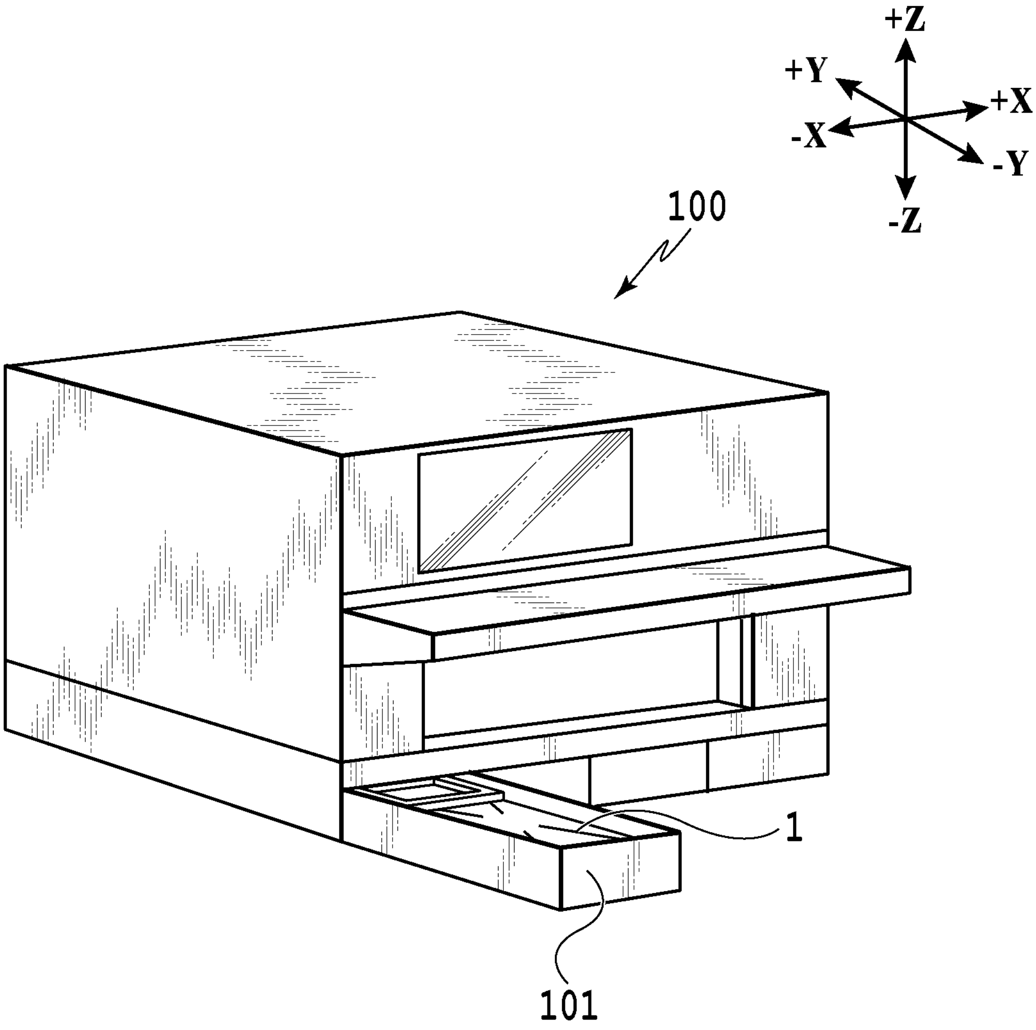
FIG. 1 is a perspective view of a liquid jetting apparatus in a first embodiment.

FIG. 1 is a perspective view of a liquid jetting apparatus 100 in which a liquid storage body 1 according to a first embodiment is mounted. The coordinates axes used in drawings will now be described. The Y direction is a direction in which a housing tray 101 included in the liquid jetting apparatus 100 moves forward and backward relative to the liquid jetting apparatus 100. The +Y direction is a direction in which the housing tray 101 moves forward relative to the liquid jetting apparatus 100. The −Y direction is a direction in which the housing tray 101 moves backward relative to the liquid jetting apparatus 100. The X direction represents the width direction of the liquid storage body 1. The Z direction represents the height direction of the liquid storage body 1. The X, Y, and Z directions are orthogonal to one another.

The liquid storage body 1 can be moved forward and backward in the Y direction relative to the liquid jetting apparatus 100 in a detachably attachable manner. The liquid jetting apparatus 100 includes a print head (not illustrated), a print medium housing part (not illustrated), a print medium conveyance mechanism (not illustrated), the housing tray 101 housing the liquid storage body 1, and so on. The liquid jetting apparatus 100 performs printing by ejecting liquids from the print head onto a print medium. The liquid storage body 1 stores therein a liquid to be ejected from the print head of the liquid jetting apparatus 100. In the present invention, the liquid is supplied from the liquid storage body 1 to the print head by transferring the liquid under predetermined suction conditions with a pump unit provided inside the liquid jetting apparatus 100. Note that the configuration of the present invention is applicable also to liquid jetting apparatuses configured to supply liquids by means of a difference of potential head or the like.

(Configuration of Liquid Storage Body 1)

A configuration of the liquid storage body 1 according to the present embodiment will be described using FIGS. 2 and 3.

Figure 2A:
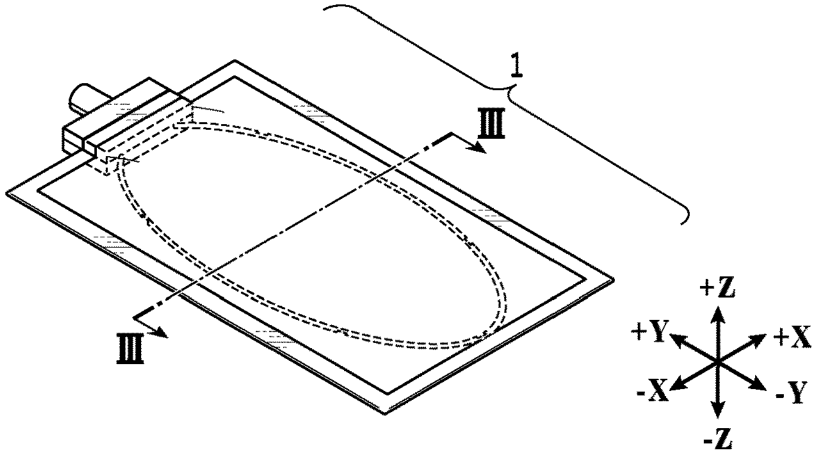
FIG. 2A illustrates a schematic perspective view of a liquid storage body according to the first embodiment.
Figure 2B:
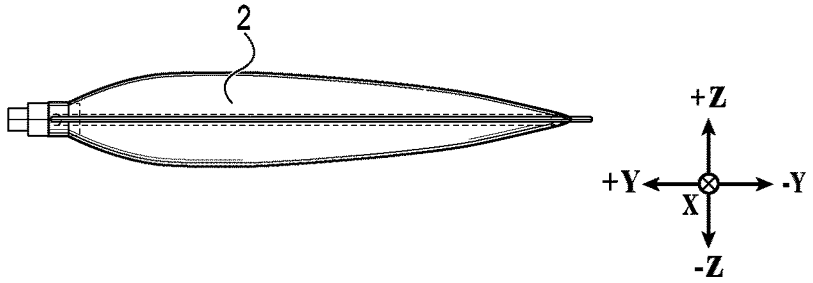
FIG. 2B is a schematic side view of the liquid storage body according to the first embodiment.
Figure 2C:
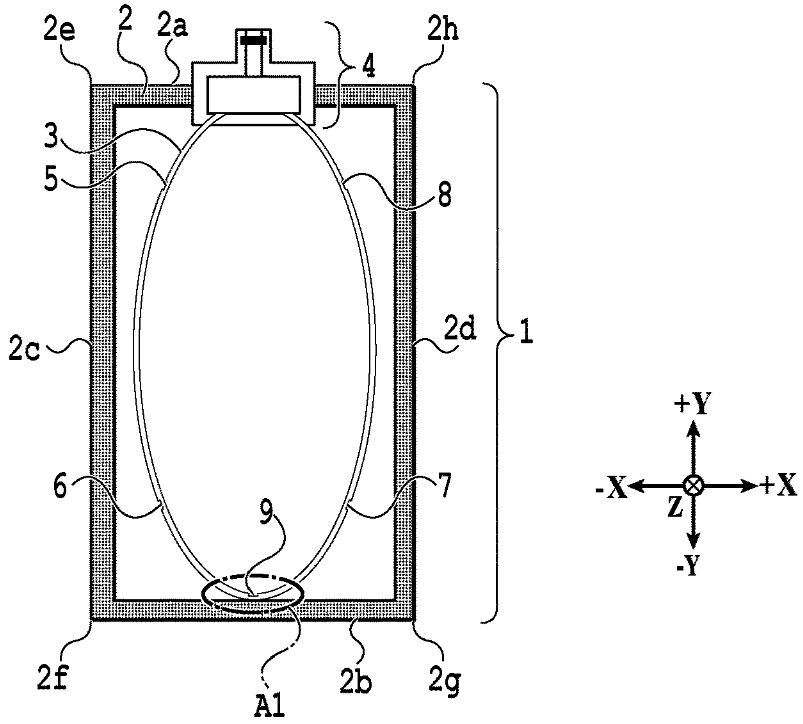
FIG. 2C is a schematic view illustrating an internal structure of the liquid storage body as seen from the +Z direction in FIG. 2A.

FIGS. 2A to 2C are schematic views of the liquid storage body 1. FIG. 2A illustrates a perspective exterior view of the liquid storage body 1 according to the present embodiment.

FIG. 2A illustrates the liquid storage body 1 in a state where the liquid stored therein has all been consumed. FIG. 2B is a schematic side view of the liquid storage body 1 according to the present embodiment. FIG. 2B illustrates the liquid storage body 1 in a state where the liquid stored therein has not been consumed.

FIG. 2C is a view of the liquid storage body 1 illustrated in FIG. 2A as seen from the +Z direction with the upper (+Z-side) one of two sheets forming a bag 2 removed, or a schematic view illustrating an internal structure of the liquid storage body as seen from the +Z direction in FIG. 2A.

As illustrated in FIG. 2C, the liquid storage body 1 has the bag 2, which is flexible and stores the liquid (i.e., bag part), and a channel part 3 which is housed inside the bag 2 and takes in the liquid stored inside the bag 2 and lets the liquid flow to a liquid outlet part 4.

In the present embodiment, the bag 2 is of a pillow type including two films of a rectangular shape (e.g., an oblong shape) laid one on top of the other with the films' ends joined by welding or the like. Specifically, the bag 2 is formed of a laminate including a plurality of layers such as polyester layers, aluminum layers, nylon layers, or polyethylene layers. A different material or composition may be employed according to the liquid's properties or the required quality, for example, by providing silica vapor deposition layers or ethylene-vinyl alcohol copolymer (EVOH) layers.

In a view of the bag 2 as seen from the +Z direction, each end portion of the films of the bag 2 is an edge having one end side and the other end side. Here, the one end side is, for example, the −X side in the drawings while the other end side is, for example, the +X side in the drawings.

A first end portion 2*a* of the bag 2 has the liquid outlet part 4. A second end portion 2*b* opposes the first end portion 2*a*. In the present embodiment, the first and second end portions 2*a* and 2*b* form the edges on the short sides of the oblong bag 2 (i.e., the sides along the X direction). The length of each of the (X-direction) edges at the first and second end portions 2*a* and 2*b* is 120 mm. The bag 2 further has a third end portion 2*c* connecting one end of the first end portion 2*a* and one end of the second end portion 2*b*, and a fourth end portion 2*d* connecting the other end of the first end portion 2*a* and the other end of the second end portion 2*b*. In the present embodiment, the third and fourth end portions 2*c* and 2*d* form the edges on the long sides of the oblong bag 2 (i.e., the sides along the Y direction). The length of each of the (Y-direction) edges at the third and fourth end portions 2*c* and 2*d* is 220 mm.

Moreover, the bag 2 has a first corner portion 2*e* at which the first and third end portions 2*a* and 2*c* meet, and a second corner portion 2*f* at which the third and second end portions 2*c* and 2*b* meet. The bag 2 further has a third corner portion 2*g* at which the second and fourth end portions 2*b* and 2*d* meet, and a fourth corner portion 2*h* at which the fourth and first end portions 2*d* and 2*a* meet. Hereinafter, these corner portions will be referred to as "corner portions" as appropriate unless they need to be distinguished from one another.

In the present embodiment, the channel part 3 has a plurality of liquid inlet ports through which to take the liquid inside the bag 2 into the channel part 3. In the present embodiment, the channel part 3 has a first liquid inlet port 5, a second liquid inlet port 6, a third liquid inlet port 7, a fourth liquid inlet port 8, and a fifth liquid inlet port 9 (hereinafter these liquid inlet ports will be referred to simply as "liquid inlet portion" or "liquid inlet portions" unless they need to be distinguished from one another).

As illustrated in FIG. 2B, before the liquid is supplied to the liquid jetting apparatus 100, the liquid storage body 1 has the liquid (ink) stored therein and the bag 2 therefore bulges. The liquid outlet part 4 is attached to the first end portion 2*a* of the bag 2. The liquid outlet part 4 functions to discharge the liquid stored in the bag 2 to the liquid jetting apparatus 100 while the liquid storage body 1 is in a state of being connected to the liquid jetting apparatus 100.

Figure 3:
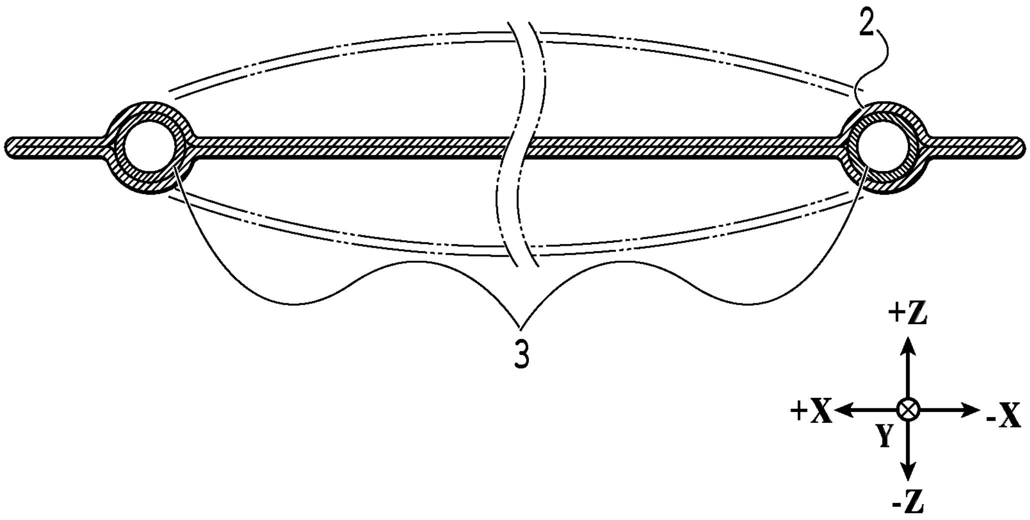
FIG. 3 is a cross-sectional view along the line in FIG. 2A.

FIG. 3 is a cross-sectional view along the line in FIG. 2A. To make it easier to understand that the bag 2 becomes crushed as the liquid stored in the liquid storage body 1 is consumed, the position of the bag 2 before the bag 2 becomes crushed is illustrated with long dashed double-short dashed lines. As illustrated in FIG. 3, in a case where the liquid stored in the liquid storage body 1 is all supplied to the liquid jetting apparatus 100, the portion of the bag 2 housing the channel part 3 turns into a protruding shape.

(Configurations of Bag 2 and Channel Part 3)

Next, the channel part 3 will be described. The channel part 3 is a hollow tube containing a resin as its material. Note that the channel part 3 is formed of a single flexible tube in the present embodiment. Both ends of the single tube are connected to the liquid outlet part 4. The channel part 3 may of course be formed by joining a plurality of tubes. The plurality of tubes may be joined by using a connector or the like. In this case too, both ends of the channel part 3 as a whole, formed of the plurality of tubes, are connected to the liquid outlet part 4.

In the present embodiment, the liquid stored inside the bag 2 is taken into the channel part 3 through the liquid inlet portions and then supplied to the liquid jetting apparatus 100. The outer diameter of the channel part 3 is 4 mm. The inner diameter of the channel part 3 is 3 mm. Also, the channel part 3 contains polytetrafluoroethylene (PTFE) as its material. The above-mentioned outer diameter, inner diameter, and material are determined with the wettability with the liquid and the elasticity taken into consideration. A material different from PTFE or different diameters may of course be selected depending on the size, rigidity, or the like of the bag 2 to be used. Note that the bag 2 needs to be capable of being deformed (i.e., crushed) by suction of the liquid and also have certain rigidity.

The channel part 3 has such rigidity as to prevent the bag 2 from bending. For this reason, the materials of the bag 2 and the channel part 3 need to be selected such that the bag 2, the channel part 3, and the liquid suction force satisfy the following relationship.

Rigidity of Bag 2<Liquid Suction Force<Rigidity of Channel Part 3 (Formula 1)

Next, a positional relationship between the bag 2 and the channel part 3 will be described using FIG. 2C. As illustrated in FIG. 2C, one end of the channel part 3 is connected to a first connection hole 22*a* (see FIG. 9) included in the liquid outlet part 4. The other end of the channel part 3, on the other hand, is connected to a second connection hole 22*b* (see FIG. 9). Since the channel part 3 is flexible, connecting both ends of the channel part 3 to the liquid outlet part 4 renders the shape of the channel part 3 a substantially U-shape. Thus, the shape of the liquid outlet part 4 and the channel part 3 assembled together is an annular shape (e.g., a substantially elliptical annular shape).

In the present embodiment, the channel part 3 is elastic and has higher rigidity than the bag 2. A first area A1 of the channel part 3 is located near the second end portion 2*b* of the bag 2, which is located the farthest from the first end portion 2*a*. Thus, utilizing characteristics of the channel part 3, a tension is generated on the bag 2 for spreading the bag 2 in a first direction from the first end portion 2*a* toward the second end portion 2*b* (e.g., longitudinal direction) and in a second direction crossing the first direction (e.g., transverse direction).

Incidentally, the wording "near an end portion" used herein means within a range of the diameter of the channel part 3 from that end portion of the bag 2. In the present embodiment, portions of the channel part 3 inside the bag 2 are located within a range of about 4 mm from the end portions 2*a*, 2*b*, 2*c*, and 2*d* of the bag 2, respectively. Thus, even in a case where the bag 2 becomes crushed as the liquid inside the bag 2 is consumed, a tension is generated on the bag 2 in the first and second directions. Accordingly, the bag 2 is prevented from bending. In other words, the bag 2 is kept from wrinkling or sagging. Also, the concept of "near an end portion" does not exclude contact with the end portion 2*a*, 2*b*, 2*c*, or 2*d* of the bag 2. The effect of the tension from the channel part 3 functions more reliably in a case where the channel part 3 is in contact with the end portions of the bag 2.

(Configuration of Liquid Inlet Portions)

A configuration of the liquid inlet portions of the channel part 3 according to the present embodiment will now be described. As illustrated in FIG. 2C, in the case where the shape of the liquid storage body 1 is a substantially oblong shape, the corner portions of the bag 2 are located far from the channel part 3. For this reason, inside the bag 2, the liquid tends to remain around the corner portions of the bag 2 although the channel part 3 has the liquid inlet portions. To address this, in the present embodiment, the openings of some liquid inlet ports are oriented in directions toward the corner portions of the bag 2 in order to actively take in the liquid remaining around the corner portions. Specifically, the opening of the first liquid inlet port 5 is oriented in a direction toward the first corner portion 2*e*. The opening of the second liquid inlet port 6 is oriented in a direction toward the second corner portion 2*f*. The opening of the third liquid inlet port 7 is oriented in a direction toward the third corner portion 2*g*. The opening of the fourth liquid inlet port 8 is oriented in a direction toward the fourth corner portion 2*h*.

Also, the opening of the fifth liquid inlet port 9 provided at the first area A1 of the channel part 3 is oriented toward the inside of the bag 2. This is to take in the liquid from around the center of the bag 2 as well, and also because it is necessary to adjust a balance with the positions of the first to fourth liquid inlet ports 5 to 8 and the orientations of their openings taken into consideration.

Figure 4:
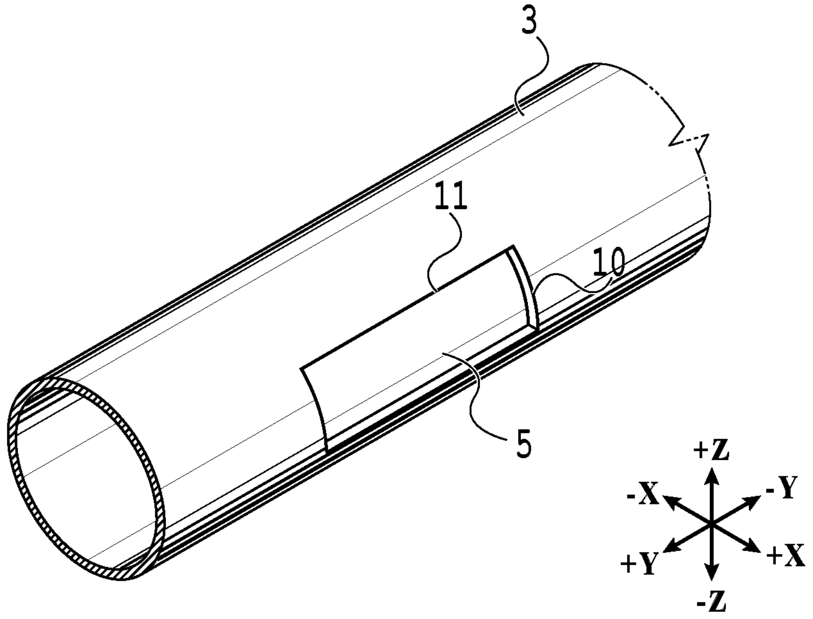
FIG. 4 is a partial enlarged view schematically illustrating part of a liquid inlet portion in the first embodiment.

FIG. 4 is a schematic enlarged view partially illustrating one of the liquid inlet portions of the channel part 3. FIG. 4 illustrates the first liquid inlet port 5 as an example of the liquid inlet portions. The shape of the first liquid inlet port 5 is a rectangular shape (e.g., an oblong shape). A vertical width 10 of the first liquid inlet port 5 extends along the Z direction. A horizontal width 11 of the first liquid inlet port 5 extends along the Y direction. The vertical width 10 is 1 mm. The horizontal width 11 is 3 mm. Note that the opening shape of the liquid inlet portions is not limited to a rectangular shape. It is needless to say that any shape may be employed as long as the liquid inlet portions can take in the liquid to such an extent as to implement the "liquid inlet" function in the present invention, and that the opening shape may be a shape such as a polygonal shape, a circular shape, or an elliptical shape, for example.

(Verification Test)

A test was conducted to confirm that, even in the case where the channel part 3 had a plurality of liquid inlet portions, the liquid was taken in not only from a liquid inlet portion located close to the liquid outlet part 4 but also from a liquid inlet portion located far from the liquid outlet part 4.

Figure 5:
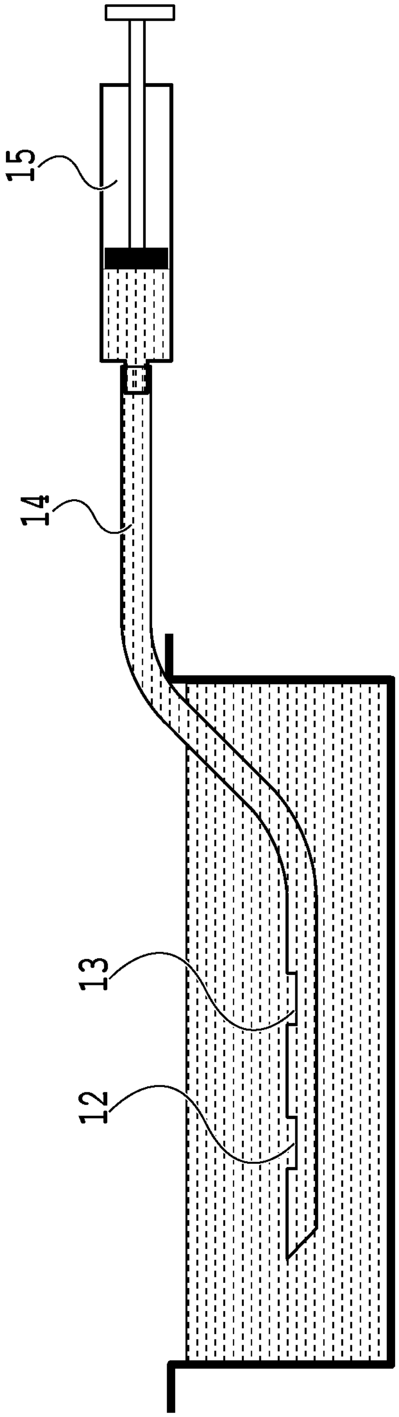
FIG. 5 is a diagram schematically illustrating how a verification test was carried out.

FIG. 5 is a diagram schematically illustrating how the verification test was conducted. In the test, an ink was put in a container. Then, one end of a second channel part 14 having a sixth liquid inlet port 12 and a seventh liquid inlet port 13 was sealed. The other end of the second channel part 14 was connected to a syringe 15 that sucks the ink in the container. Then, the ink in the container was sucked under the same suction conditions as with the liquid jetting apparatus 100. The outer diameter of the second channel part 14 was 8 mm. The inner diameter of the second channel part 14 was 5 mm. The horizontal width of the sixth liquid inlet port 12 and the horizontal width of the seventh liquid inlet port 13 were both 4 mm. The vertical width of the sixth liquid inlet port 12 and the vertical width of the seventh liquid inlet port 13 were both 1 mm. The interval between the sixth and seventh liquid inlet ports 12 and 13 was 50 mm. From the result of the test, it was confirmed that the ink was taken in not only from the seventh liquid inlet port 13 located closer to the syringe 15 than the sixth liquid inlet port 12 was but also from the sixth liquid inlet port 12 located farther from the syringe 15 than the seventh liquid inlet port 13 was.

(Liquid Outlet Part 4)

Figure 6A:
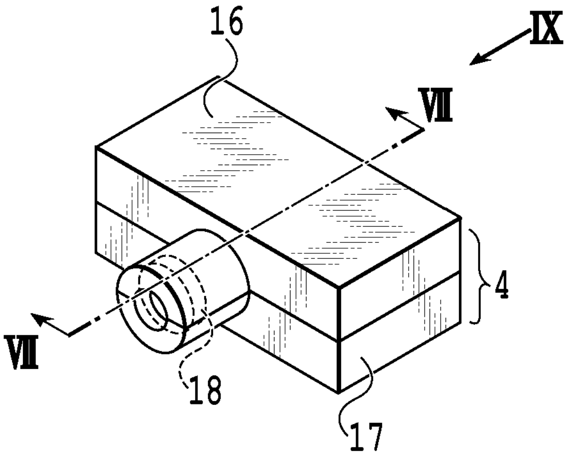
FIG. 6A is a schematic view of a liquid outlet part in the first embodiment.
Figure 6B:
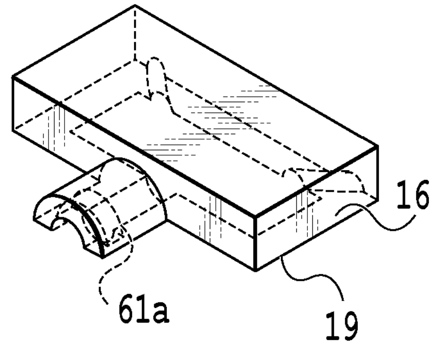
FIG. 6B is a perspective view of a first half-cut body forming the liquid outlet part in the first embodiment.
Figure 6C:
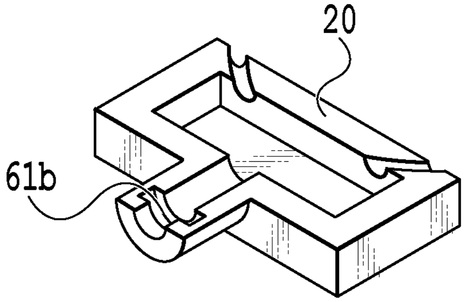
FIG. 6C is a perspective view of a second half-cut body forming the liquid outlet part in the first embodiment.

FIGS. 6A to 6C are views explaining the liquid outlet part 4. FIG. 6A is a schematic view of the liquid outlet part 4. As illustrated in FIG. 6A, the liquid outlet part 4 includes a first half-cut body 16, a second half-cut body 17, and a rubber packing 18. Note that the first and second halves 16 and 17 contain a resin as their constituent material. Moreover, the first and second halves 16 and 17 has the same shape. FIG. 6B is a perspective view of the first half-cut body 16. FIG. 6C is a perspective view of the second half-cut body 17.

The liquid outlet part 4 is created by fixing a first joining surface 19 provided on the first half-cut body 16 and a second joining surface 20 provided on the second half-cut body 17 to each other. Note that examples of the method of fixing the first and second joining surfaces 19 and 20 include bonding, welding, and so on.

The rubber packing 18 is sandwiched between a first groove 61*a* provided in the first half-cut body 16 and a second groove 61*b* provided in the second half-cut body 17. The rubber packing 18 is fixed with an adhesive agent.

Figure 7:
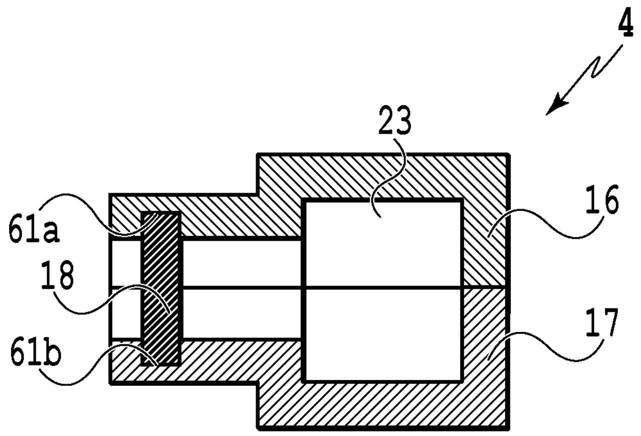
FIG. 7 is a cross-sectional view along the line VII-VII in FIG. 6A.

FIG. 7 is a cross-sectional view along the line VII-VII in FIG. 6A. As illustrated in FIG. 7, the liquid outlet part 4 has a junction portion 23 which receives the liquid taken in through the channel part 3. At the junction portion 23, portions of the liquid taken in from the liquid inlet portions of the channel part 3 are mixed with one another. Even in a case where the components of the liquid are unevenly present inside the bag 2, the liquid can be supplied to the liquid jetting apparatus 100 with the unevenness of the components reduced by mixing the portions of the liquid at the junction portion 23.

Figure 8:
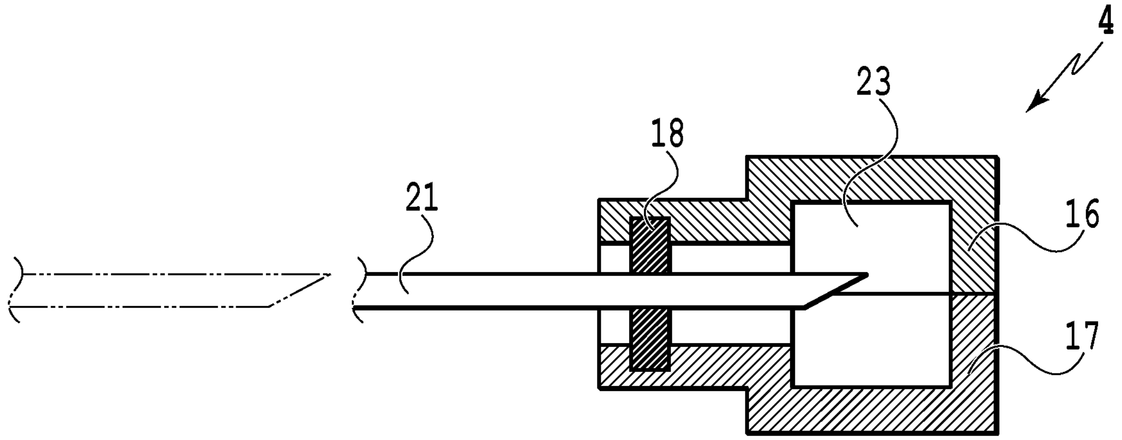
FIG. 8 is a schematic cross-sectional view schematically illustrating the liquid outlet part in a state of being connected to the liquid jetting apparatus in the first embodiment.

FIG. 8 is a cross-sectional view of the liquid outlet part 4 in a state of being connected to the liquid jetting apparatus 100. A hollow needle 21 included in the liquid jetting apparatus 100 pierces through the rubber packing 18 as the liquid storage body 1 is connected to the liquid jetting apparatus 100. Then, the liquid inside the bag 2 is supplied to the liquid jetting apparatus 100 through the channel part 3 and the liquid outlet part 4.

(Joining of Liquid Outlet Part 4 and Channel Part 3)

Figure 9:
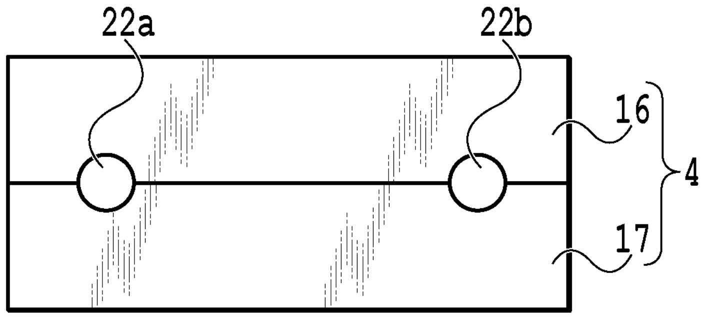
FIG. 9 is a view of the liquid outlet part in the first embodiment as seen from the direction of the arrow IX in FIG. 6A.

FIG. 9 is a view of the liquid outlet part 4 as seen from the direction of the arrow IX in FIG. 6A. The liquid outlet part 4 has the first connection hole 22*a*, to which the one end of the channel part 3 can be connected, and the second connection hole 22*b*, to which the other end of the channel part 3 can be connected. Both ends of the channel part 3 are connected to the liquid outlet part 4 by connecting the one end of the channel part 3 to the first connection hole 22*a* and connecting the other end of the channel part 3 to the second connection hole 22*b*. As for the method of fixing the channel part 3 connected to the liquid outlet part 4, the channel part 3 may be fixed with an adhesive agent or fixed by fitting.

(Conclusion)

The liquid storage body 1 according to the present embodiment is such that the channel part 3 is provided in a substantially U-shape inside the bag 2. In this state, a portion of the channel part 3 is located near the second end portion 2*b* located the farthest from the liquid outlet part 4, to which both ends of the channel part 3 are connected. Moreover, the channel part 3 has the liquid inlet portions. In this way, it is possible to keep taking in the liquid until the bag 2 is completely crushed along the channel part 3 with a tension kept on the bag 2 by means of the rigidity of the channel part 3. Thus, the liquid storage body according to the present embodiment improves the ease of using up the liquid stored therein.

Moreover, the liquid storage body 1 according to the present embodiment is resistant to leakage of the liquid upon being dropped. In a case where a conventional liquid storage body is dropped by mistake, the end portions of the channel part may pierce through the bag, thereby letting the liquid leak out of the bag. However, in the liquid storage body 1 according to the present embodiment, both ends of the channel part 3 are connected to the inside of the liquid outlet part 4. Hence, even in a case where the liquid storage body 1 is dropped, the possibility of the end portions of the channel part 3 piercing through the bag 2 is low. In other words, the liquid storage body 1 according to the present embodiment is considered resistant to leakage of the liquid upon being dropped.

Furthermore, the liquid storage body 1 according to the present embodiment is resistant to impact received upon being dropped. In the present embodiment, the channel part 3 is disposed in a substantially U-shape inside the bag 2. Hence, even in a case where the liquid storage body 1 is dropped, the impact of the drop can be absorbed by the elasticity of the channel part 3 as long as any one of the edges of the bag 2 hits the ground first. In other words, the liquid storage body 1 according to the present embodiment is considered resistant to impact received upon being dropped.

Second Embodiment

An object of a second embodiment is to provide a liquid storage body capable of further improving the ease of using up the liquid therein. For components similar to those in the first embodiment, the same reference signs will be used and description of those components will be omitted. The difference from the first embodiment will be mainly described.

Figure 10:
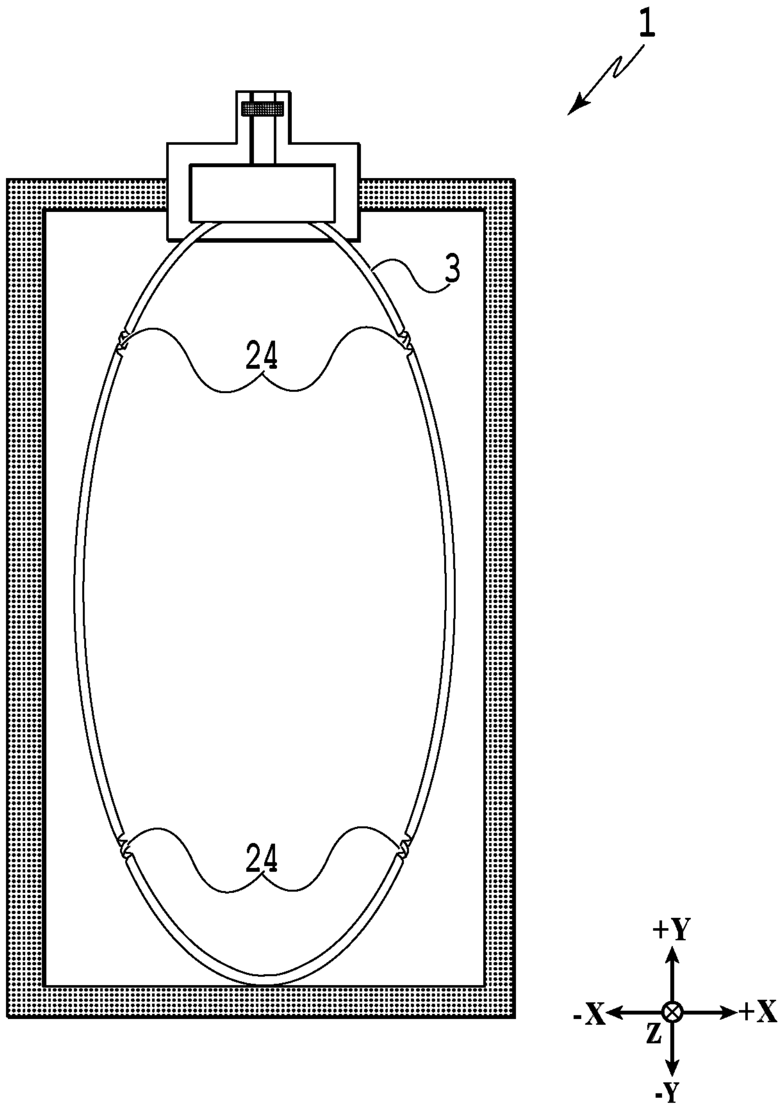
FIG. 10 is a schematic view illustrating an internal structure of a liquid storage body in a second embodiment as seen from the +Z direction.

FIG. 10 is a view of a liquid storage body 1 in the present embodiment as seen from the +Z direction with the upper one of the two sheets forming the bag 2 removed, or a schematic view illustrating an internal structure of the liquid storage body as seen from the +Z direction. As illustrated in FIG. 10, a channel part 3 according to the present embodiment has eighth liquid inlet ports 24.

Figure 11:
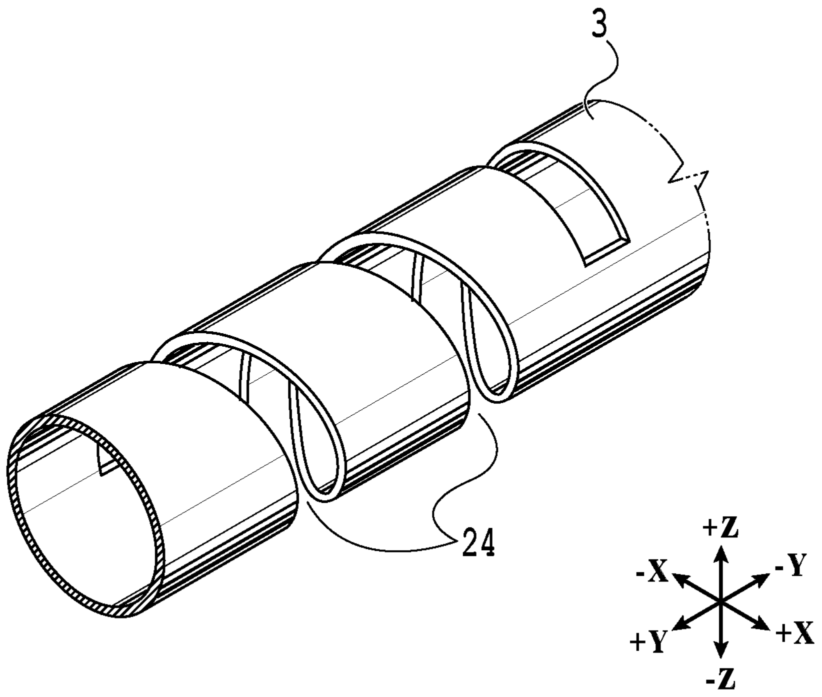
FIG. 11 is a partial enlarged view schematically illustrating part of a liquid inlet port according to the second embodiment.

FIG. 11 is a schematic enlarged view of an eighth liquid inlet port 24. As illustrated in FIG. 11, in the present embodiment, each eighth liquid inlet port 24 is a slit cut obliquely in the channel part 3. Specifically, the shape of each eighth liquid inlet port 24 is a spiral shape. In this way, the channel part 3 can take the liquid into the channel part 3 from all sides in the circumferential direction. For example, the channel part 3 can take in the liquid from the −Z side, on which the liquid tends to accumulate. Incidentally, in a case where the use of the eighth liquid inlet ports 24 lowers the rigidity of the channel part 3, the material may be changed or the tube thickness or the like may be changed. This ensures the rigidity of the channel part 3. The interval between the cuts in each eighth liquid inlet port 24 is 1 mm. Also, in the present embodiment, each eighth liquid inlet port 24 is provided by forming a cut winding twice along the channel part 3, but the present embodiment is not limited to this configuration. For example, the cut does not have to be formed in the channel part 3 so as to wind once along the channel part 3. Moreover, a cut may be formed in a direction orthogonal to the channel part 3 as long as the channel part 3 is not separated into a plurality of parts. Furthermore, in the present embodiment, the eighth liquid inlet ports 24 are provided at four positions such that their openings are oriented toward the corner portions of the bag 2, but the present embodiment is not limited to this configuration. The number of slits in each eighth liquid inlet port 24 or the positions to dispose the eighth liquid inlet ports 24 may be changed as appropriate according to the amount of the liquid to be taken in or the like.

As described above, the liquid storage body according to the present embodiment improves the ease of using up the liquid therein to a greater extent than the liquid storage body according to the first embodiment.

Third Embodiment

An object of a third embodiment is to provide a liquid storage body capable of further improving the ease of using up the liquid therein. For components similar to those in the first embodiment, the same reference signs will be used and description of those components will be omitted. The difference from the first embodiment will be mainly described.

Figure 12:
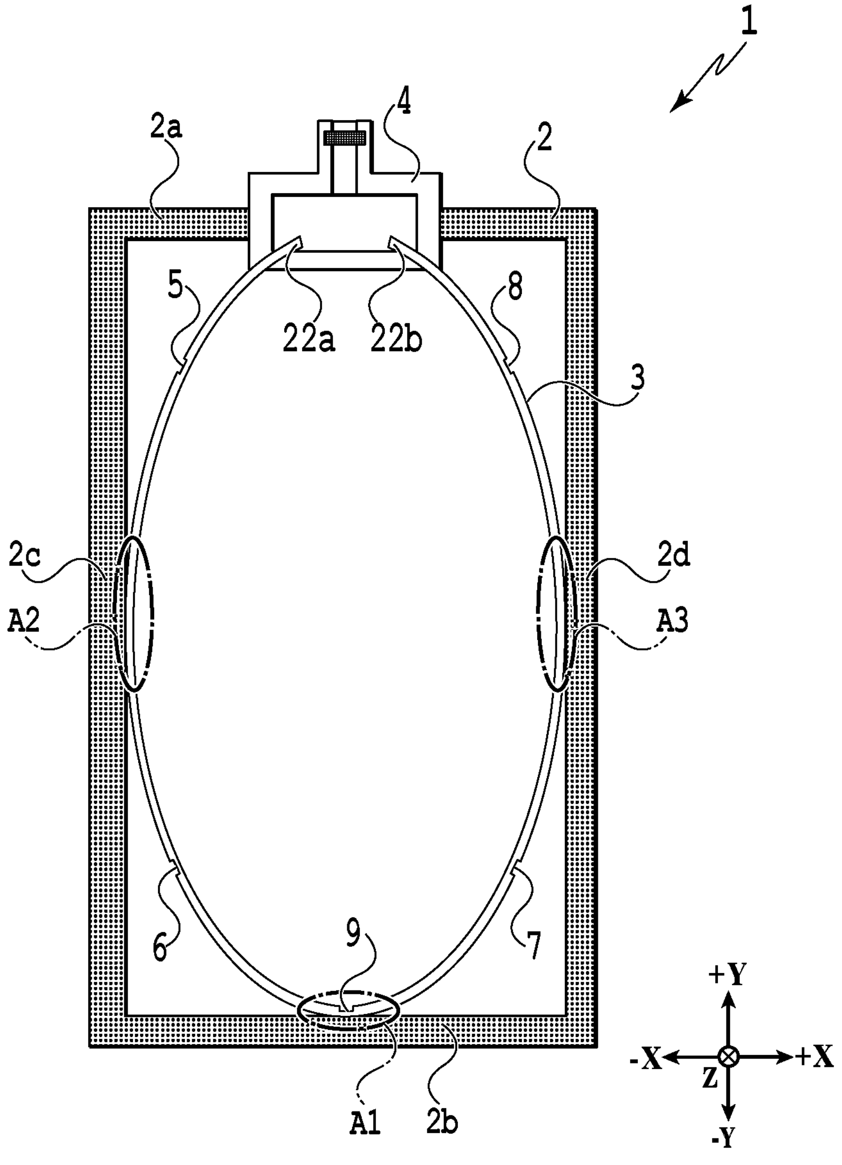
FIG. 12 is a schematic view illustrating an internal structure of a liquid storage body in a third embodiment as seen from the +Z direction.

FIG. 12 is a view of a liquid storage body 1 in the present embodiment as seen from the +Z direction with the upper one of the two sheets forming the bag 2 removed, or a schematic view illustrating an internal structure of the liquid storage body as seen from the +Z direction in FIG. 2A.

In the present embodiment, a second area A2 located at a substantially midpoint between the first area A1 of the channel part 3 and the one end of the channel part 3 (the end connected to the first connection hole 22*a* of the liquid outlet part 4 (see FIG. 9)) is located near the third end portion 2*c*. Similarly, a third area A3 located at a substantially midpoint between the first area A1 of the channel part 3 and the other end of the channel part 3 (the end connected to the second connection hole 22*b* of the liquid outlet part 4 (see FIG. 9)) is located near the fourth end portion 2*d*. In this way, a tension is generated on the bag 2 according to the present embodiment for spreading the bag 2 in the first direction from the first end portion 2*a* toward the second end portion 2*b* (e.g., longitudinal direction) and in the second direction crossing the first direction (e.g., transverse direction) more strongly than in the first embodiment.

For the channel part 3 to be set to spread wider in the second direction than in the first embodiment, the interval between the first and second connection holes 22*a* and 22*b* illustrated in FIG. 9 may be made wider. Alternatively, the formation angles of the first and second connection holes 22*a* and 22*b* may be set such that the first and second connection holes 22*a* and 22*b* are more parallel to each other.

In the case where the shape of the liquid storage body 1 is a substantially oblong shape, the bag 2 may bend also in the first direction as the liquid inside the bag 2 is consumed. Nonetheless, in the present embodiment, the tension generated is stronger than that in the first embodiment.

This prevents formation of a choked portion from which the liquid inside the bag 2 cannot be taken in. That is, the liquid storage body according to the present embodiment further improves the ease of using up the liquid stored therein.

Other Embodiments

Figure 13:
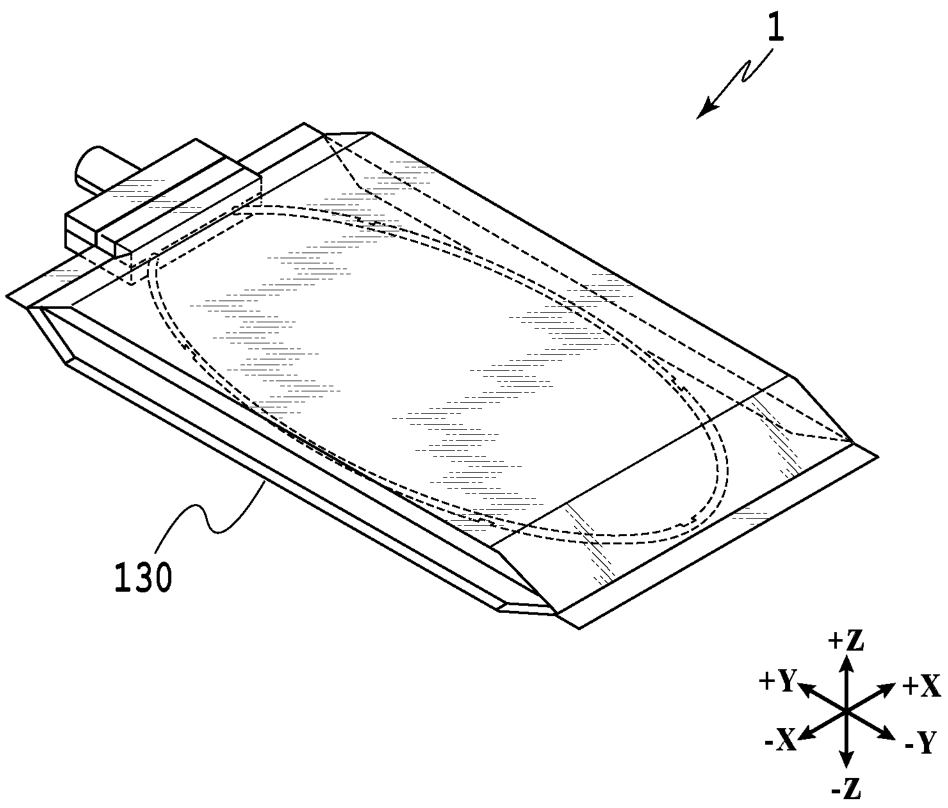
FIG. 13 is a view illustrating an example of a liquid storage body having gusset portions.

FIG. 13 is view illustrating an example of a liquid storage body 1 having gusset portions. In the first embodiment, the liquid storage body 1 has no gusset portions but may have gusset portions. As illustrated in FIG. 13, a gusset bag 130 with gussets formed at both ends in the X direction may be used. In another example, a bag 2 formed by folding a single sheet into the form of an envelope and welding it may be used instead of the bag 2 formed of two sheets.

In the first embodiment, the opening size of each liquid inlet portion is the same but may be different. The balance of the opening sizes of the liquid inlet portions may be adjusted based on the amounts of the liquid to be taken in from the liquid inlet portions, and then the opening sizes may be determined. For example, the first and fifth liquid inlet ports 5 and 9 may have different opening sizes. Specifically, the opening size of the first liquid inlet port 5, which is located closer to the liquid outlet part 4 than the fifth liquid inlet port 9 is, may be smaller than the opening size of the fifth liquid inlet port 9. This is because being close to the liquid outlet part 4 reduces the flow resistance of the channel part 3 and facilitates the suction of the liquid. It is preferable to adjust the opening size of each liquid inlet portion with the rigidity of the channel part 3 set as high as possible.

In first embodiment, the channel part 3 is provided in a substantially elliptical annular shape, but may be provided in a polygonal shape.

Some or all of the first to third embodiments may be combined.

The liquid storage body according to the present disclosure improves the ease of using up the liquid stored in the liquid storage body.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2022-063281, filed Apr. 6, 2022 and No. 2023-002383, filed Jan. 11, 2023, which are hereby incorporated by reference herein in their entirety.

What is claimed is:

1. A liquid storage body comprising:

a bag part being flexible and configured to store a liquid therein;

a liquid outlet part attached to a first end portion of the bag part and configured to discharge the liquid stored in the bag part into a liquid jetting apparatus; and a channel part disposed inside the bag part and configured to let the liquid flow to the liquid outlet part, wherein the channel part is formed of a single tube, both ends of the channel part are connected to the liquid outlet part, a first area of the channel part is located near a second end portion of the bag part located farthest from the first end portion, and the first area of the channel part has a liquid inlet portion through which to take the liquid inside the bag part into the channel part.

2. The liquid storage body according to claim 1, wherein the channel part is disposed so as to spread the bag part from inside.

3. The liquid storage body according to claim 2, wherein the channel part generates a tension for spreading the bag part in a first direction from the first end portion toward the second end portion and in a second direction crossing the first direction.

4. The liquid storage body according to claim 1, wherein the bag part has a corner portion, and the liquid inlet portion has a liquid inlet port provided with an opening oriented toward the corner portion.

5. The liquid storage body according to claim 4, wherein a shape of the liquid inlet port is a shape selected from among a rectangular shape, a polygonal shape, a circular shape, and an elliptical shape.

6. The liquid storage body according to claim 1, wherein the liquid inlet portion is a slit obliquely cut in the channel part.

7. The liquid storage body according to claim 6, wherein a shape of the liquid inlet portion is a spiral shape.

8. The liquid storage body according to claim 1, wherein the liquid inlet portion has a first liquid inlet port and a second liquid inlet port provided at a different position from a position of the first liquid inlet port, and the first liquid inlet port and the second liquid inlet port are different in size.

9. The liquid storage body according to claim 8, wherein the first liquid inlet port is located closer to the liquid outlet part than the second liquid inlet port is, and the first liquid inlet port is smaller than the second liquid inlet port.

10. The liquid storage body according to claim 8, wherein the second liquid inlet port is located farthest from the liquid outlet part and has an opening oriented toward an inside of the bag part.

11. The liquid storage body according to claim 1, wherein the channel part is formed of a plurality of tubes.

12. The liquid storage body according to claim 1, wherein a shape of the channel part is a U-shape.

13. A liquid jetting apparatus comprising a housing tray configured to house the liquid storage body according to claim 1.

14. A liquid storage body comprising:

a rectangular bag part configured to store a liquid therein and become crushed flat as the liquid is consumed;

a liquid outlet part attached to a first end portion of the bag part and configured to discharge the liquid stored in the bag part into a liquid jetting apparatus; and a tubular channel part disposed inside the bag part to form a channel which lets the liquid in the bag part flow to the liquid outlet part while acting to spread the bag part flat as the liquid in the bag part is consumed, wherein the channel part is a single structure, has a ring shape with one end and the other end connected to the liquid outlet part, is disposed to contact an inner edge of the rectangular bag part, and has a liquid inlet portion through which to take the liquid inside the bag part into the channel part.

* * * * *